United States Patent [19]

Kaneko

[11] Patent Number: 5,355,230
[45] Date of Patent: Oct. 11, 1994

[54] FACSIMILE APPARATUS AND FACSIMILE SYSTEM

[75] Inventor: Yoji Kaneko, Yamato, Japan

[73] Assignee: Canon Kabushiki Kaisha, Tokyo, Japan

[21] Appl. No.: 58,789

[22] Filed: May 10, 1993

Related U.S. Application Data

[63] Continuation of Ser. No. 524,493, May 17, 1990, abandoned.

[30] Foreign Application Priority Data

May 19, 1989 [JP] Japan .................. 1-125878

[51] Int. Cl.⁵ .............................. H04N 1/32
[52] U.S. Cl. ..................... 358/437; 358/434; 358/441; 379/94; 379/100
[58] Field of Search ............ 358/437, 441, 434; 379/94, 100

[56] References Cited

U.S. PATENT DOCUMENTS

| | | | |
|---|---|---|---|
| 4,870,678 | 9/1989 | Adachi | 358/434 |
| 4,884,269 | 11/1989 | Duncanson et al. | 370/94.1 |
| 4,888,766 | 12/1989 | Ogasawara | 370/95.1 |
| 4,935,955 | 6/1990 | Neudorfer | 379/100 |
| 4,994,926 | 2/1991 | Gordon et al. | 358/434 |
| 4,995,073 | 0/0000 | Okata et al. | 379/94 |
| 5,001,709 | 0/0000 | Satoh | 370/110.1 |
| 5,081,539 | 1/1992 | Kaneko | 358/437 |

*Primary Examiner*—John K. Peng
*Assistant Examiner*—Edward Lefkowitz
*Attorney, Agent, or Firm*—Fitzpatrick, Cella, Harper & Scinto

[57] ABSTRACT

A facsimile and a facsimile system are connected to an inside bus of an ISDN (integrated services digital network). When trouble, such as no toner, jam, no paper or the like, has occurred in a recording unit of a first facsimile apparatus on the inside bus, the first facsimile apparatus issues an announcement of interruption onto the bus. A second facsimile apparatus on the above-described bus monitors a signal on the bus. When the second facsimile has detected the announcement of interruption, it performs substituting reception in place of the first facsimile apparatus. It is thereby possible to maintain the continuation of communication even if trouble has occurred during reception and recording.

14 Claims, 14 Drawing Sheets

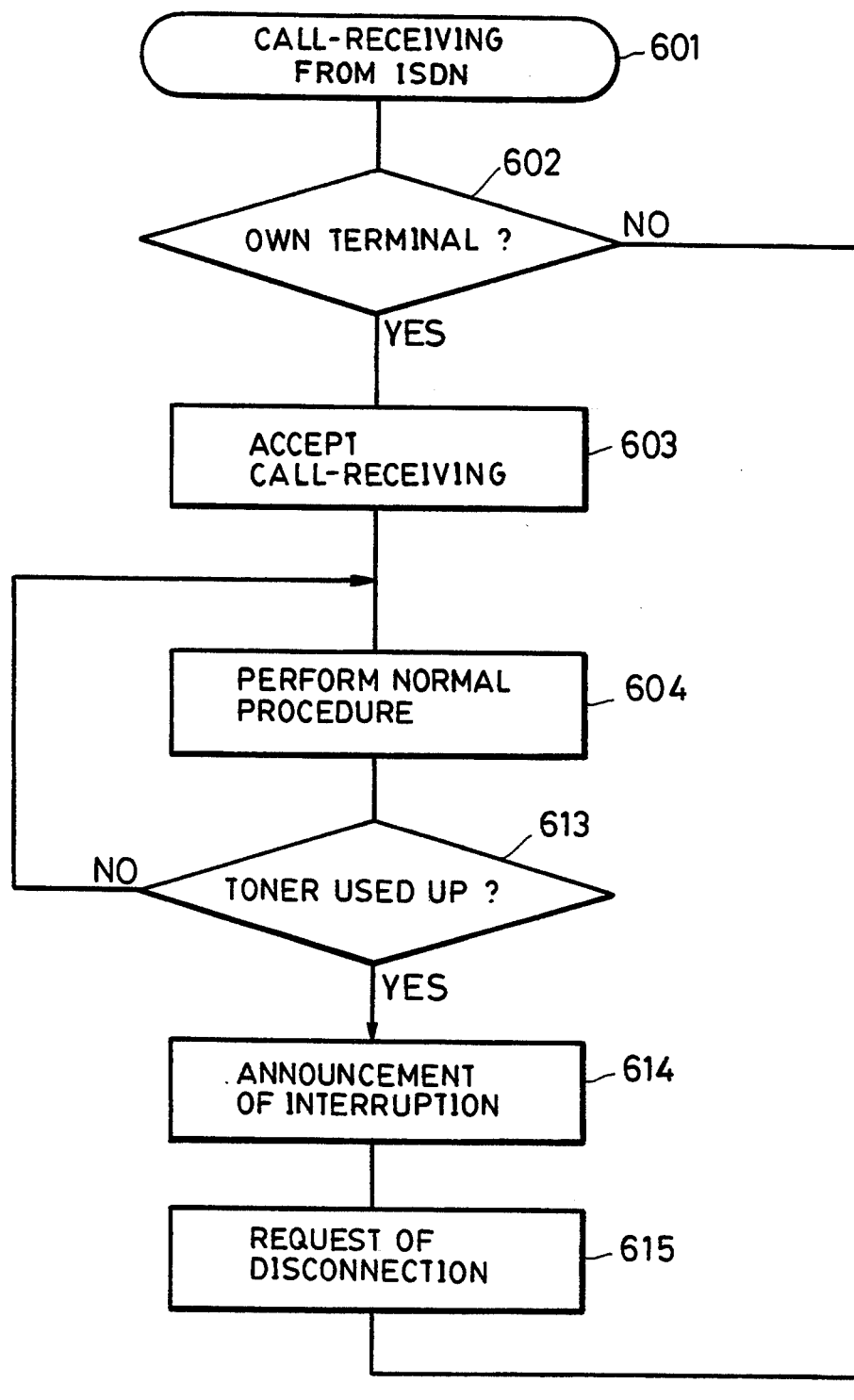

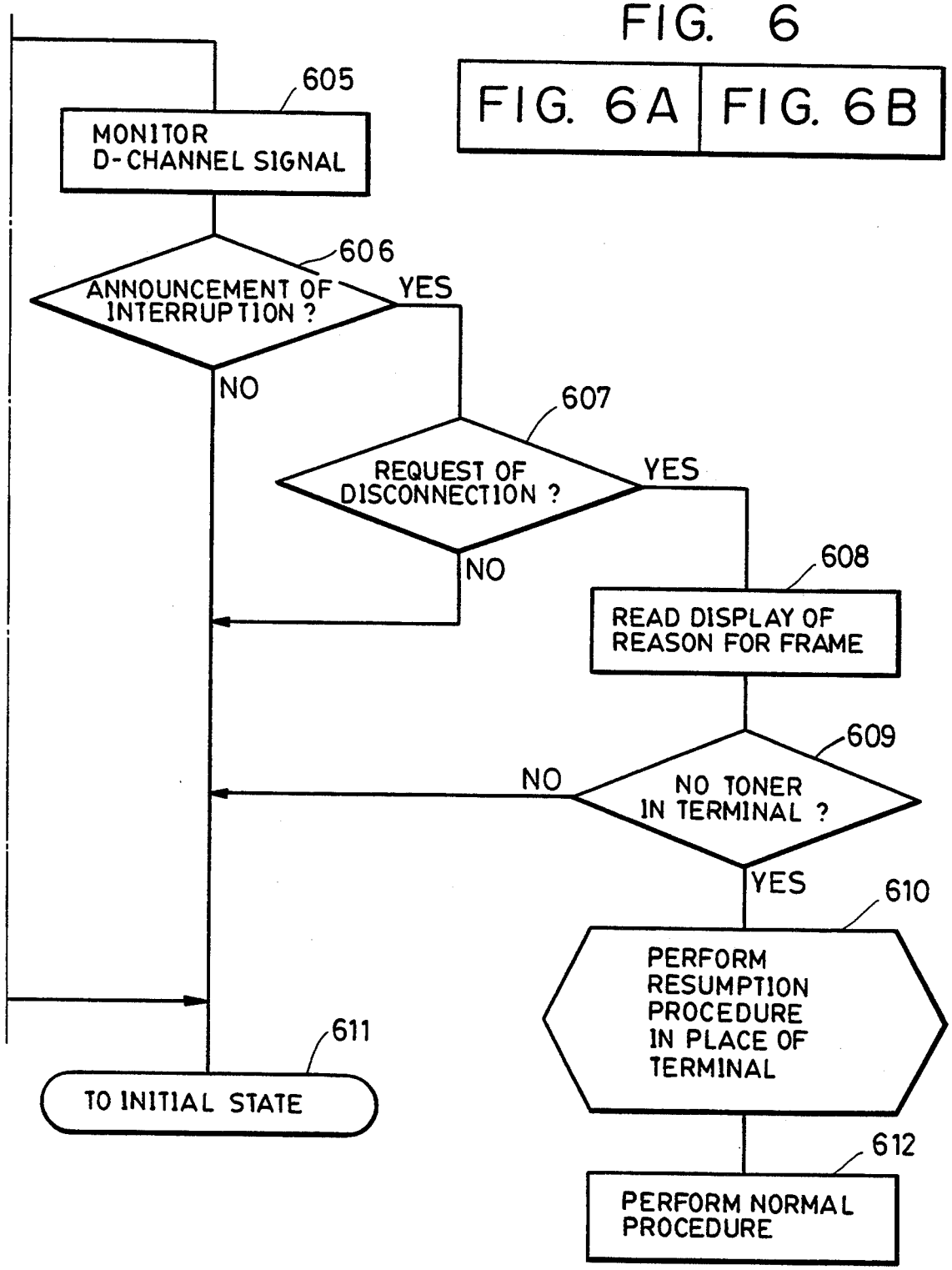

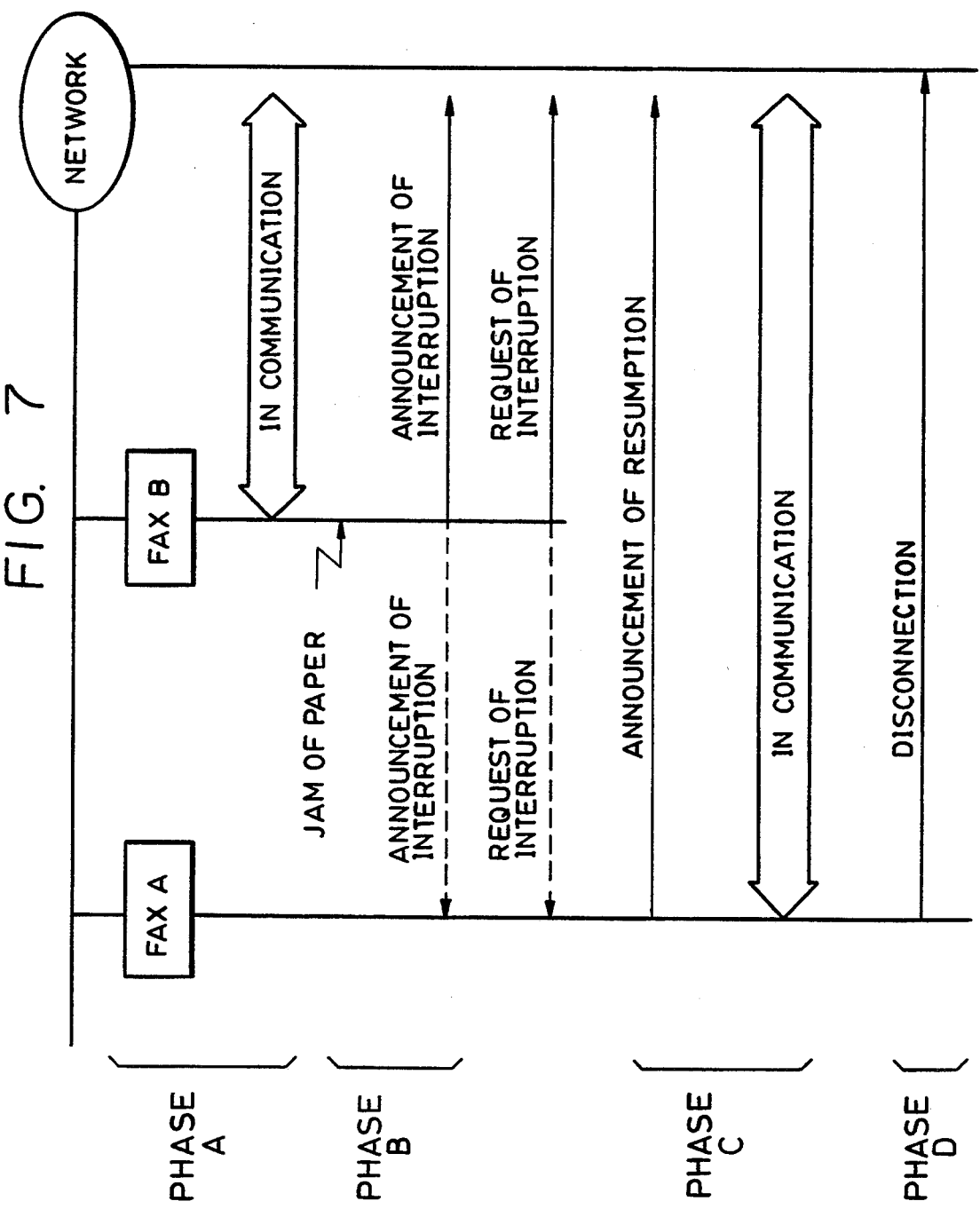

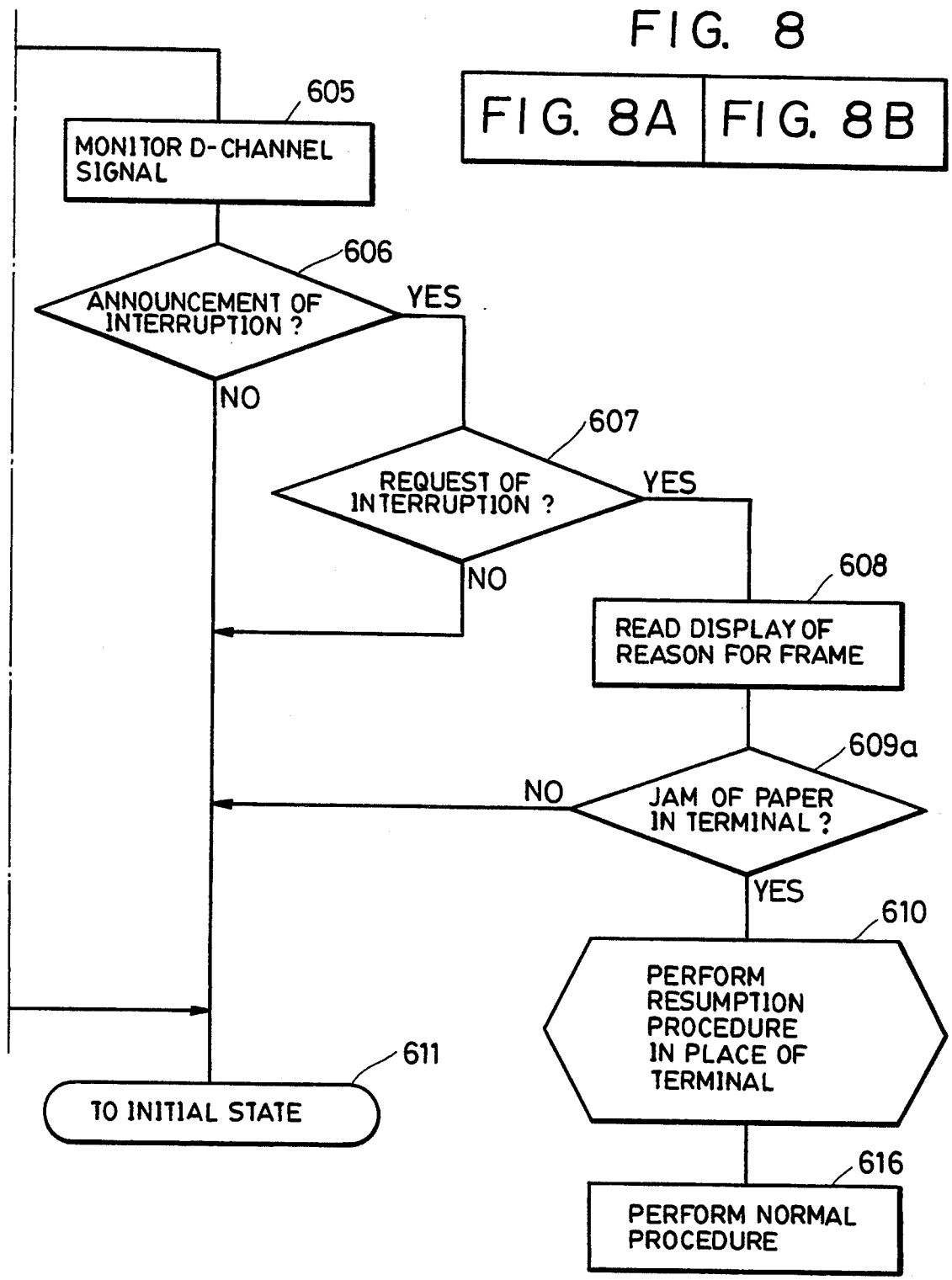

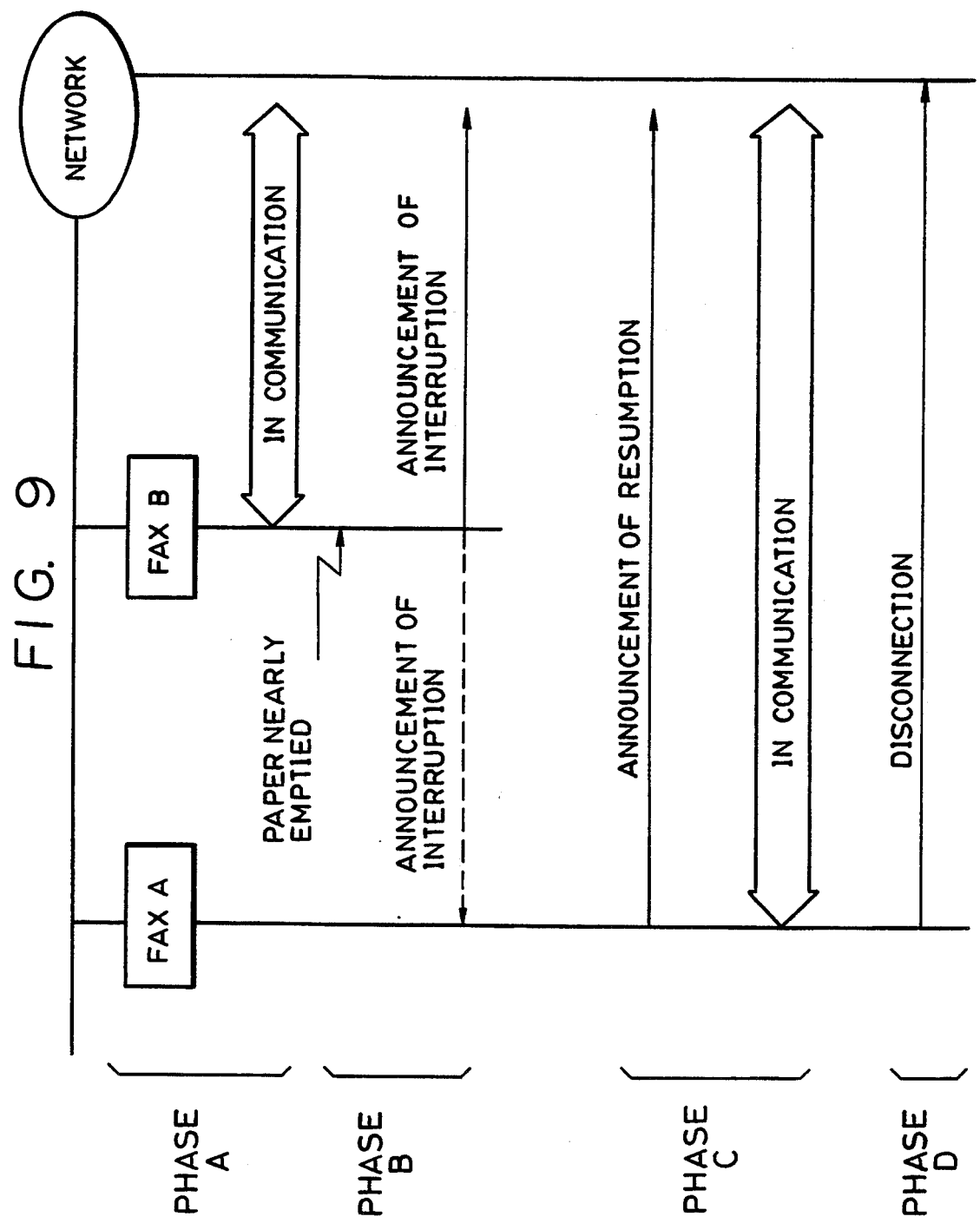

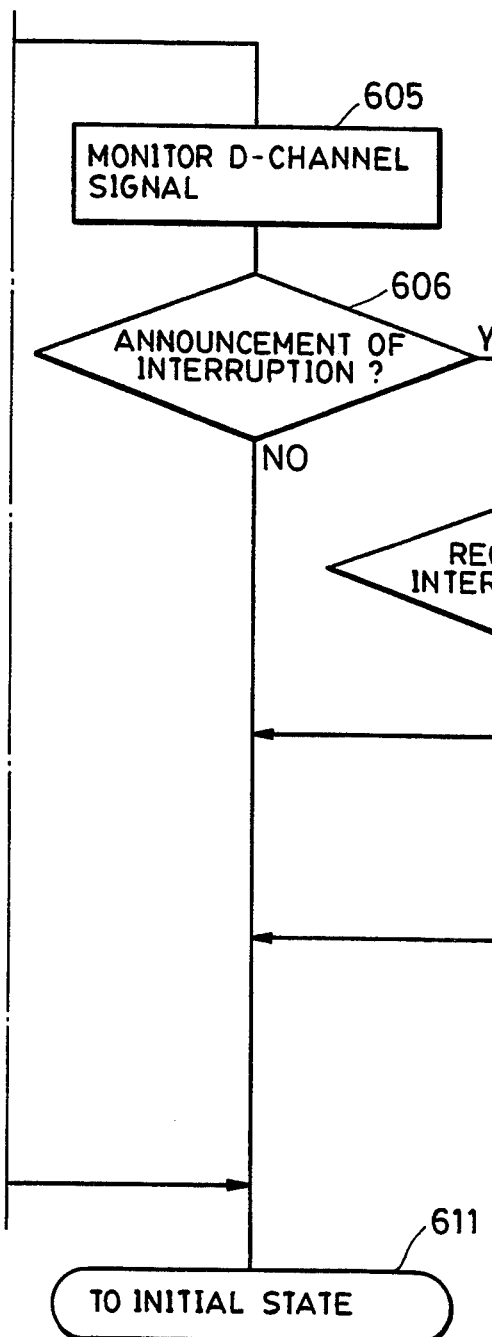

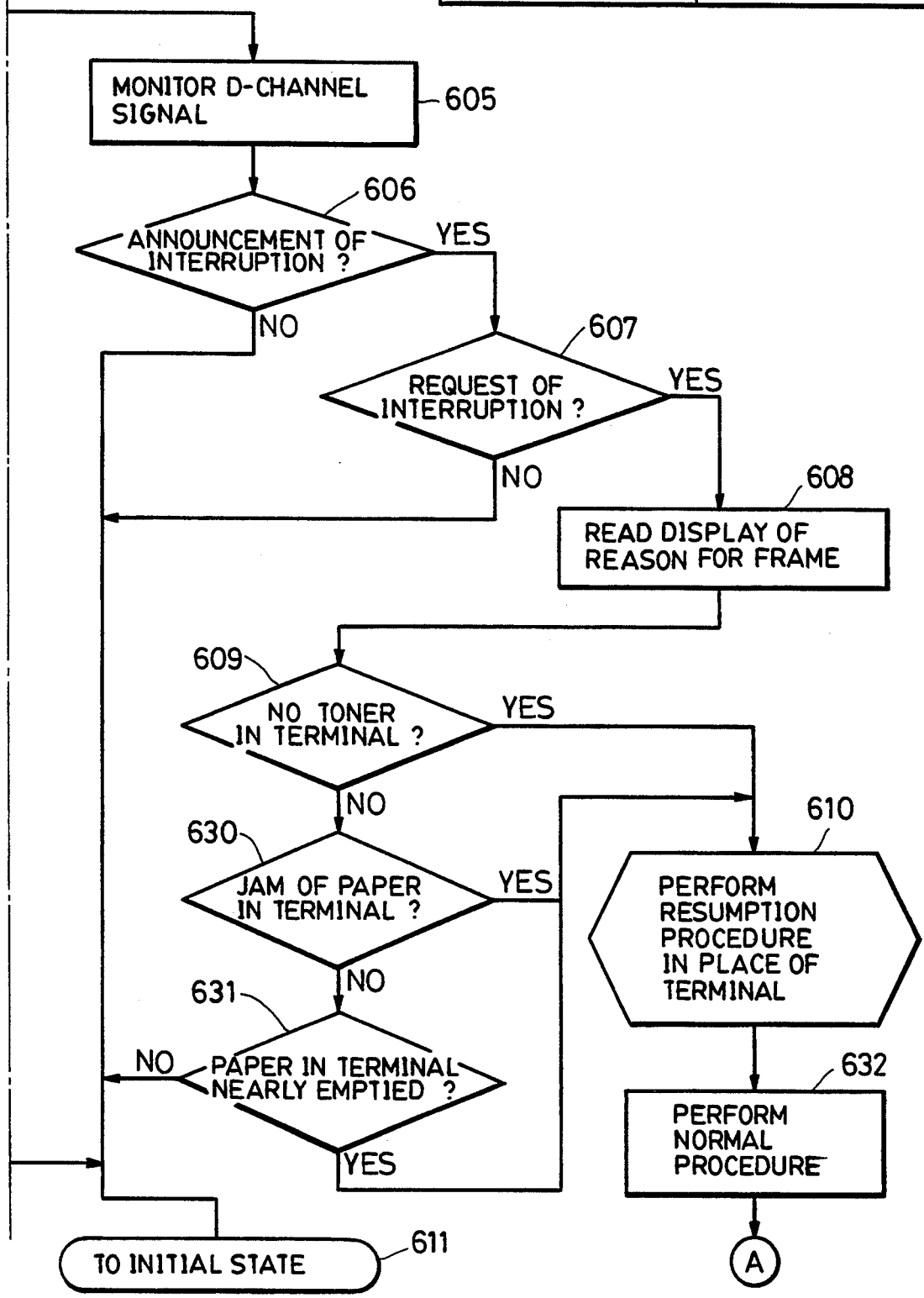

FACSIMILE APPARATUS AND FACSIMILE SYSTEM

This application is a continuation of application Ser. No. 07/524,493, filed May 17, 1990, now abandoned.

BACKGROUND OF THE INVENTION

1. Field of the Invention

This invention relates to a facsimile apparatus and a facsimile system, and more particularly, to a facsimile apparatus and a facsimile system which are suitably applied to a plurality of facsimiles connected to a bus at the side of a subscriber of an ISDN (integrated services digital network) circuit as ISDN terminals.

2. Description of the Prior Art

A facsimile uses a thermal printer, a laser-beam printer or the like as an apparatus for outputting a facsimile image in reception, and a hard copy is obtained from the output apparatus. For the hard copy, a roll of paper can be used as well as cut paper. A received image is recorded on such paper, and is output.

The above-described printers include a ribbon for transfer, toner and the like, which are used for recording.

Heretofore, in this kind of facsimile, when, for example, a ribbon, toner or the like in a printer is exhausted, it becomes impossible to perform the recording and outputting operation. A hard copy cannot be obtained when it becomes impossible to perform the recording and outputting operation on paper, Furthermore, even if there exists a required amount of the toner, ribbon or the like, and there exists a required amount of paper for the recording of a plurality of pages in a communication operation, there can also arise a case in which reception becomes impossible.

That is, it is practically extremely difficult to completely prevent the occurrence of jam when paper is output in a printer. Accordingly, it is generally impossible to prevent the occurrence of jam, and there arises the case in which reception becomes impossible due to the occurrence of jam. In particular, a facsimile is often operated when the operator is absent, such as an operation during the night. If jam occurs when the operator is absent, for example, during the night operation, the jammed state cannot be recovered, and hence reception becomes impossible, The situation is identical if the amount of toner or a ribbon becomes less than a predetermined amount or exhausted during the operation when the operator is absent. Hence, the possibility that excellent reception cannot be performed is large when the operator is absent.

Particularly in the above-described case of the exhaustion of toner, the occurrence of jam or the like in a communication operation, it is not easy to maintain the continuation of the operation even if the operator is there to adopt suitable measures.

As a countermeasure for such a case, it is possible to consider the performance of substituting reception by a memory. In this case, however, it is necessary to provide a large-capacity memory device which can store images of several tens to several hundreds of pages in substituting reception. If such a memory device is provided in a facsimile, the cost of the facsimile increases. The number of users who have introduced or intend to introduce two or more facsimiles is increasing in the present high-information society. However, if such a user individually has facsimiles having the configuration as described above in order to prevent beforehand the above-described problems, the installation cost inevitably increases in proportion to the number of apparatuses.

On the other hand, a facsimile which does not have the above-described memory device cannot deal with the case as described above, and cannot help but refuse reception on occasion.

SUMMARY OF THE INVENTION

It is an object of the present invention to provide a facsimile apparatus and a facsimile system which can dissolve the disadvantages and inconvenience as described above.

It is a further object of the present invention to provide a facsimile apparatus which can perform substituting reception when a trouble has occurred in another facsimile apparatus on an inside bus of an ISDN.

It is a still further object of the present invention to provide a facsimile apparatus which can request substituting reception by a simple method, even if a trouble has occurred during the recording of a received image.

It is still another object of the present invention to provide a facsimile system which can economically maintain the continuation of reception without performing reception by a memory even if a trouble has occurred during reception processing.

It is still a further object of the present invention to provide a facsimile apparatus which performs an announcement of interruption using a D-channel signal when a trouble has occurred.

It is still another object of the present invention to provide a facsimile system in which the other facsimile apparatus can perform substituting reception, even if a recording means is in a state of exhaustion of toner, jam, exhaustion of paper or the like.

These and other objects of the present invention will become more apparent from the following detailed description with reference to attached drawings.

BRIEF DESCRIPTION OF THE DRAWINGS

The attached drawings show embodiments of the present invention.

FIG. 6, composed of FIGS. 6A and 6B, is a program processing flowchart in the FIG. 4 embodiment;

FIG. 7 is a diagram showing an outline of a procedure in another embodiment of the present invention;

FIG. 9 is a diagram showing an outline of a procedure in still another embodiment of the present invention;

DETAILED DESCRIPTION OF THE PREFERRED EMBODIMENTS

The preferred embodiments of the present invention will now be explained with reference to the drawings.

FIGS. 1 through 6 show an embodiment of the present invention.

Figure 1:
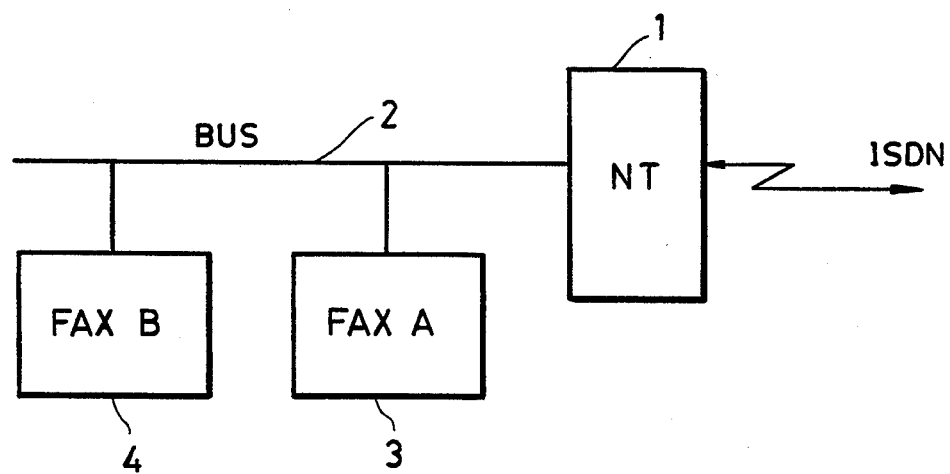
FIG. 1 is a diagram :showing an example of the form of bus connection.
Figure 2:
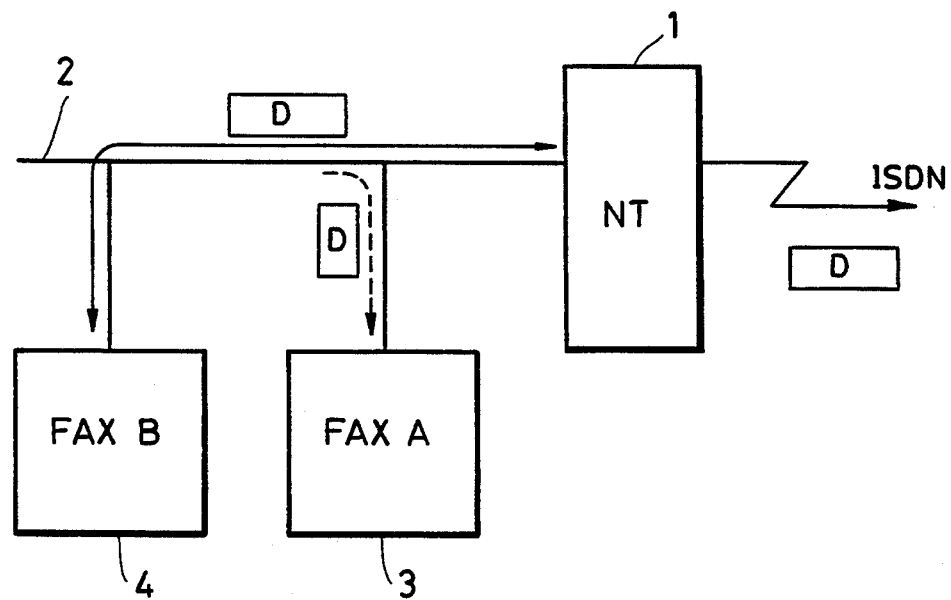
FIG. 2 is a diagram showing a flow of a D-channel signal.
Figure 3:
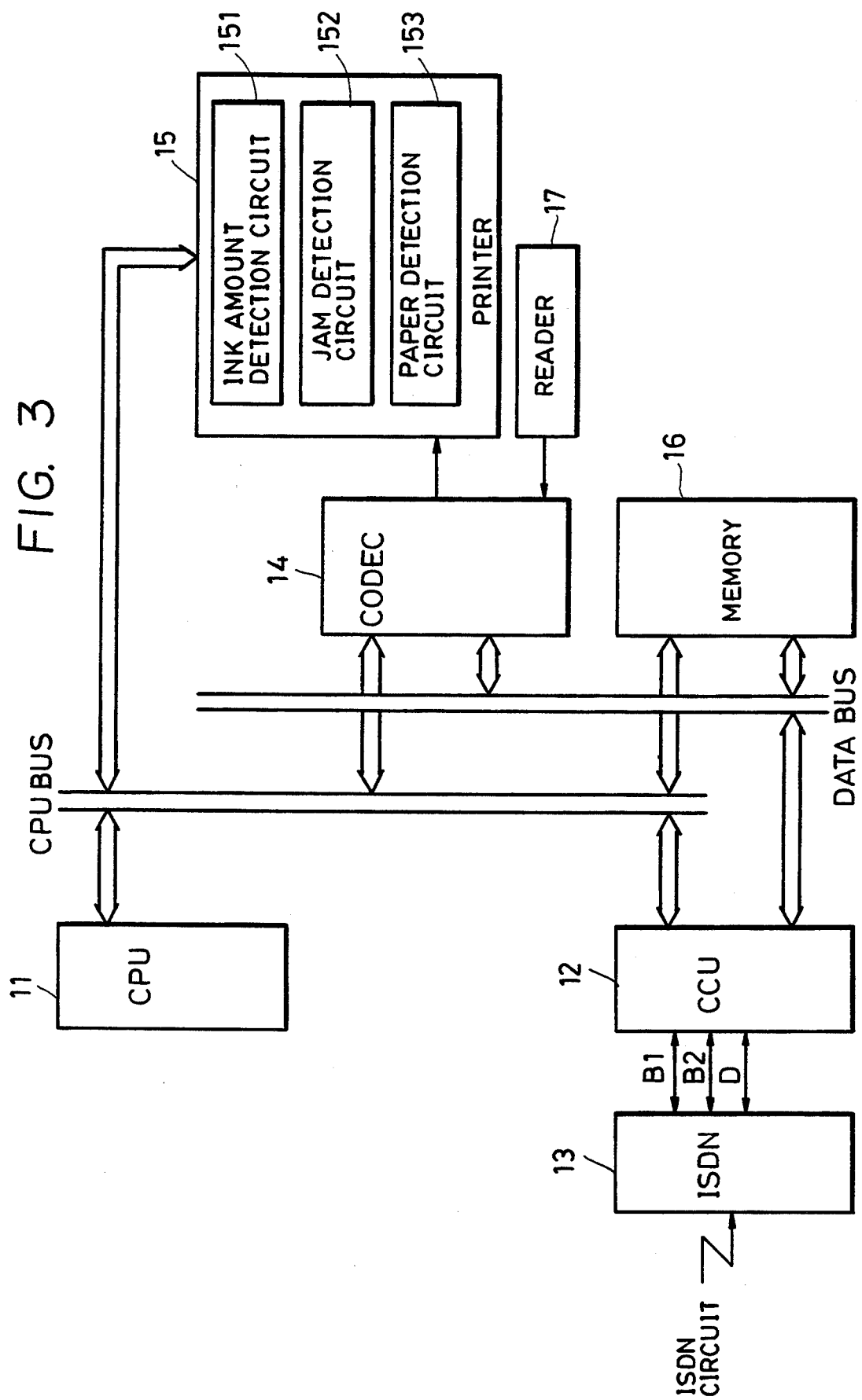
FIG. 3 is a block diagram of the configuration of a facsimile.
Figure 4:
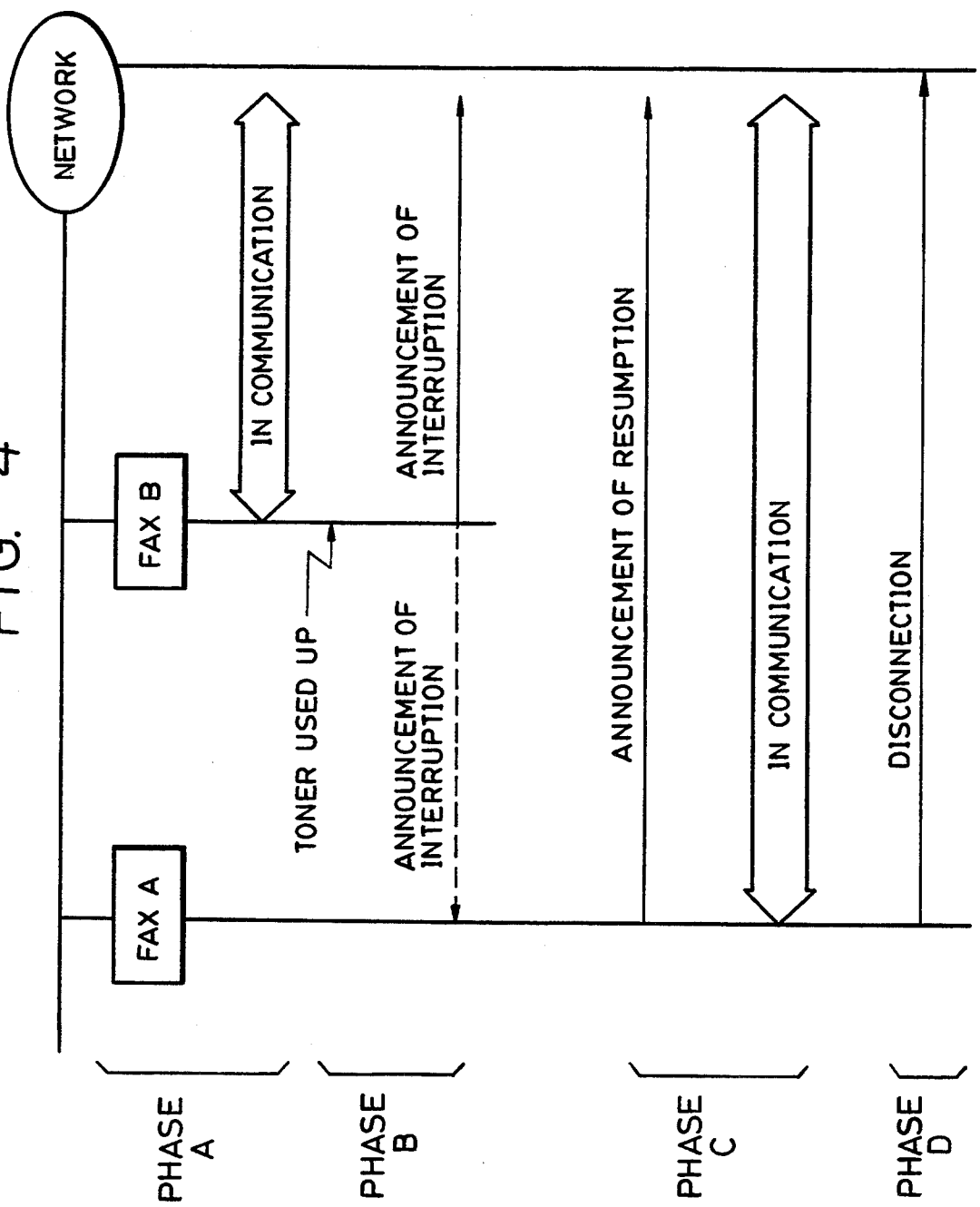
FIG. 4 is a diagram showing an outline of a procedure in an embodiment of the present invention.
Figure 5:
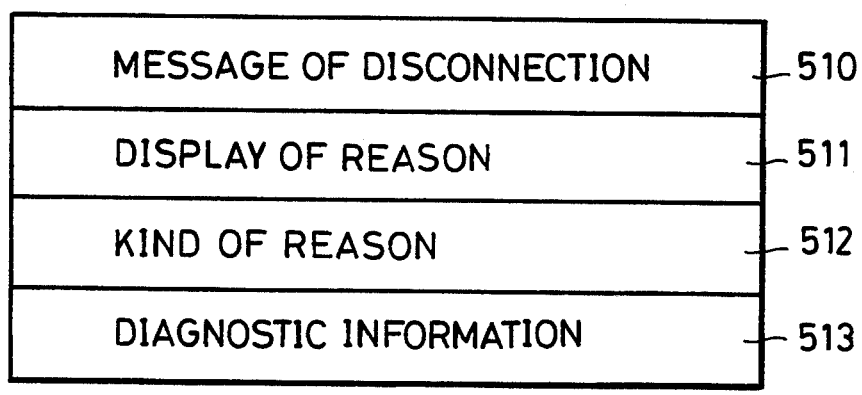
FIG. 5 is a schematic diagram of the configuration of a disconnection request frame.

FIG. 1 is a diagram of the form of bus connection. FIG. 2 is a diagram for explaining a flow of a D-channel signal. FIG. 3 is a block diagram of the configuration of a facsimile used. FIGS. 4–6 are diagrams for explaining the operation.

FIG. 1 shows a form in which a plurality of facsimiles (FAX's) are connected to a bus as ISDN terminals on an ISDN circuit, and also illustrates a facsimile terminal system according to the present invention.

The ISDN terminal system includes a bus interconnection connected to an NT (network termination) 1 provided by the side of an ISDN. A bus-connected FAX A3 and another bus connected FAX B4 are connected on a bus 2 of a subscriber's line.

Various kinds of information communication services based on various kinds of media, such as voice, images, data and the like, are expected for the ISDN as a digital network. In the ISDN, 1 versus n interconnections (bus interconnections) is provided as a type of interconnection in a basic interface. In that interface (an interface consisting of two conventional B-channels (ch) and one conventional D-channel (ch)), eight terminals at the maximum can be connected in a circuit, among which two terminals can be used at the same time.

The D-channel is also called a signal channel, and is used for carrying a signal for exchanging and controlling information channels.

FIG. 2 shows an example of the flow of such a D-channel signal in the system shown in FIG. 1.

In FIG. 2, the flow of the D-channel signal, for example, in a case in which the FAX B4 is in communication, is as follows. That is, the FAX B4 in communication communicates with the ISDN via the bus 2 and NT1. The flow of the D-channel signal in the case in which the FAX B4 is in communication is as shown by a solid line. Since the FAX A3 is also connected to the bus 2 as described above, the D-channel signal also flows to the FAX A3, as shown by a broken line. As will be described later, in the bus connection in the ISDN circuit, the D-channel signal for the FAX B4 also flows to the ISDN and the FAX A3.

Thus, the D-channel signal can be monitored by the other FAX on the bus.

The above-described facsimiles (FAX's A and B) can be configured in the following way.

FIG. 3 is a block diagram showing an example of the configuration of the above-described FAX (A or B).

In FIG. 3, a CPU 11 controls the entire facsimile, and a CCU (communication control unit) 12 controls communication. That is, the CPU 11 controls the entire facsimile according to a stored program.

The present apparatus further includes an ISDN interface (I/F) circuit 13, a CODEC (coder/decoder) 14, a printer 15, a reader 17, and the like.

The CPU 11 is connected to a CPU bus, to which the above-described CCU 12 and CODEC 14 are connected. A data bus is connected to the CODEC 14. Also connected are the printer 15 for printing received original-image information during reception, and the reader 17 for reading an original during transmission.

A memory 16 operates as a conventional buffer. The memory 16 can store a few pages of images. The present facsimile does not have a conventional memory device which can store several tens to several hundreds of pages of images.

The ISDN I/F circuit 13 performs the control for connecting the FAX to the bus 2 shown in FIGS. 1 and 2, and monitors the above-described D-channel signal.

The CCU 12 for controlling communication performs the D-channel signal control with the ISDN I/F 13, and the like. The CODEC 14 encodes and decodes a facsimile image to be transmitted or which has been received into facsimile codes (MH, MR and MMR).

The printer 15 outputs an image signal decoded by the CODEC 14 onto paper. That is, the printer 15, which provides a hard copy of image information, prints and outputs on paper, includes a recording mechanical unit, and depicts an original picture of the transmission side onto reception paper using an input image signal. The recording mechanical unit may use any proper method, for example, a thermal recording method, a laser-beam recording method, or the like.

The printer 15 includes an ink amount detection circuit 151 for detecting an ink amount of toner, an ink ribbon or the like, a jam detection circuit 152 for detecting the occurrence of jam of paper, and a paper detection circuit 153 for detecting a small residual amount of paper, the absence of paper or the like. Since these circuits are already known, a detailed explanation thereof will be omitted.

If the recording mechanical unit of the printer 15 of the facsimile used in the present system uses the laser-beam method using toner for recording, the ink amount detection circuit 151 detects the amount of toner. When disconnection is performed because of the exhaustion of toner, the CPU 11 issues an announcement of interruption for that reason by a D-channel signal based on a toner-exhaustion signal from the printer 15.

In the case of substituting reception, which will be described later, a case is assumed in which the exhaustion of toner has occurred during communication in the printer of the FAX B. Accordingly, at least the FAX B shown in FIGS. 1 and 2 has the function of issuing an announcement of interruption. By providing the two apparatuses with this function, one apparatus can consign the reception function to the other apparatus under a predetermined condition (a condition of the exhaustion of toner, or the like). Thus, the two apparatuses can supplement each other. That is, if there occurs a trouble in the FAX A, the FAX B can perform reception, and if there occurs a trouble in the FAX B, the FAX A can perform reception.

Next, a specific, explanation will be provided of the operation and the like of the present embodiment also with reference to FIGS. 4–6.

In the ISDN terminal system having the facsimiles configured as described above, substituting reception is executed by the facsimiles A and B as follows.

First, an outline of the procedure will be explained with reference to FIG. 4.

In FIG. 4, in phase A, the FAX B is in communication with the network. In this case, a received image is output to the printer 15 of the FAX B. Subsequently, if, for example, the exhaustion of toner has occurred in the printer 15 of the FAX B in phase B, and the FAX B issues an announcement of interruption by a D-channel signal, the signal flows to the network side and the FAX A, as described before (see FIG. 2).

The FAX A on the same bus detects this signal, issues an announcement of resumption (phase C) by a D-channel signal onto the ISDN circuit by its own CCU 12 and ISDN I/F 13, and resumes the reception operation in place of the FAX B. In the reception operation in phase C, an image signal is decoded from facsimile codes by the CODEC 14 in the FAX A, and is output by its own printer 15. Substituting reception thus becomes possible.

If reception is thus continued and the FAX A has completed the substituting reception operation, disconnection processing is then performed in phase D. That is, a disconnection request is issued to the network by a D-channel signal, call-receiving from the network is released, and the communication is thus terminated.

FIG. 5 shows a schematic configuration of a "disconnection request frame".

The disconnection request frame has the reason for disconnection within the frame. In FIG. 5, there are shown a disconnection message 510 which announces disconnection, a display 511 of the reason, a display 512 of the kind of the reason, and the information 513 of a diagnosis of the contents of the reason, which is "no toner in the terminal" in the present example.

The frame having such a configuration can be monitored by the other facsimile, which is not in a reception operation on the D-channel signal.

Such a substituting reception operation processing will now be explained more specifically in accordance with the flowchart shown in FIG. 6.

In the present embodiment, the facsimile has a control function with the network by a D-channel signal in order to be subjected to bus connection onto the ISDN circuit, and a monitoring function of the D-channel signal. The facsimile detects that an announcement of interruption due to the reason of the exhaustion of toner or a ribbon has been issued from the other terminal facsimile by D-channel signal control, performs the succeeding resumption procedure in place of the other terminal facsimile, and performs the substituting reception function by subsequently entering into a reception operation. The program in the present embodiment deals with the case of "no toner in the terminal".

In FIG. 6 showing the program processing flow in the present configuration, when a call setting has been transmitted from a facsimile terminal of the correspondent, a call-receiving enters respective facsimiles connected to the bus of the ISDN by a D-channel signal (step 601).

When there has been a call-receiving as described above, each facsimile determines whether or not the call-receiving is for its own terminal referring to the call number (step 602). If the call-receiving is for its own terminal, that is, the answer is "yes" where the correspondent has assigned that own terminal, the call-receiving is accepted (step 603), and a normal reception procedure is performed (step 604).

Thus, in FIG. 4, the FAX B, for example, communicates with the correspondent. In this case, a received image is output to the printer 15 of the FAX B (phase A). If the exhaustion of toner has occurred while printing the received image, the process proceeds from step 613 to steps 614 and 615, where an announcement of interruption and a request of disconnection are issued, respectively, and the process returns to the initial state.

On the other hand, if the call-receiving has not been for its own terminal (when the answer at step 602 is "no"), the process shifts to the processing at step 605. In FIG. 4, the FAX A side shifts to this processing.

At step 605, the D-channel signal is monitored, and the facsimile watches whether or not the other facsimile has issued an announcement of interruption in the D-channel signal (step 606). If the announcement of interruption has not come, that is, the answer is "no" the process returns to the initial state (step 611).

On the other hand, if an announcement of interruption has been detected, that is, the determination result of "yes" has been obtained at step 606 (phase B in FIG. 4), the facsimile then watches for the issue of a request of disconnection (step 607). If the answer is "no", the process proceeds to the above-described step 611. If a request of disconnection has been issued, that is, the determination result of "yes" has been obtained also at step 607, the display of reason is seen in accordance with the format of the disconnection frame described before (step 608).

The disconnection request frame is issued after the announcement of interruption, and includes the various kinds of information described before. Using the diagnostic information for the contents of the reason, it is determined whether or not "no toner in the terminal" is indicated in the present embodiment If the answer at step 609 is "no" the process proceeds to the above-described step 611. On the other hand, if there has been the indication of "no toner in the terminal", that is, the determination result of "yes" has been obtained at step 609, the process proceeds to step 610, where a resumption procedure is performed in place of the terminal which has issued the announcement of interruption, a normal reception procedure is then performed (step 612), and the reception is continued (phase C in FIG. 4).

Thus, according to the above-described configuration, by arranging so that the other facsimile performs substituting reception during communication, the unit cost of the facsimile can be kept low. Furthermore, it is also possible to effectively utilize the bus connection which is a feature of the ISDN.

Figure 8A:
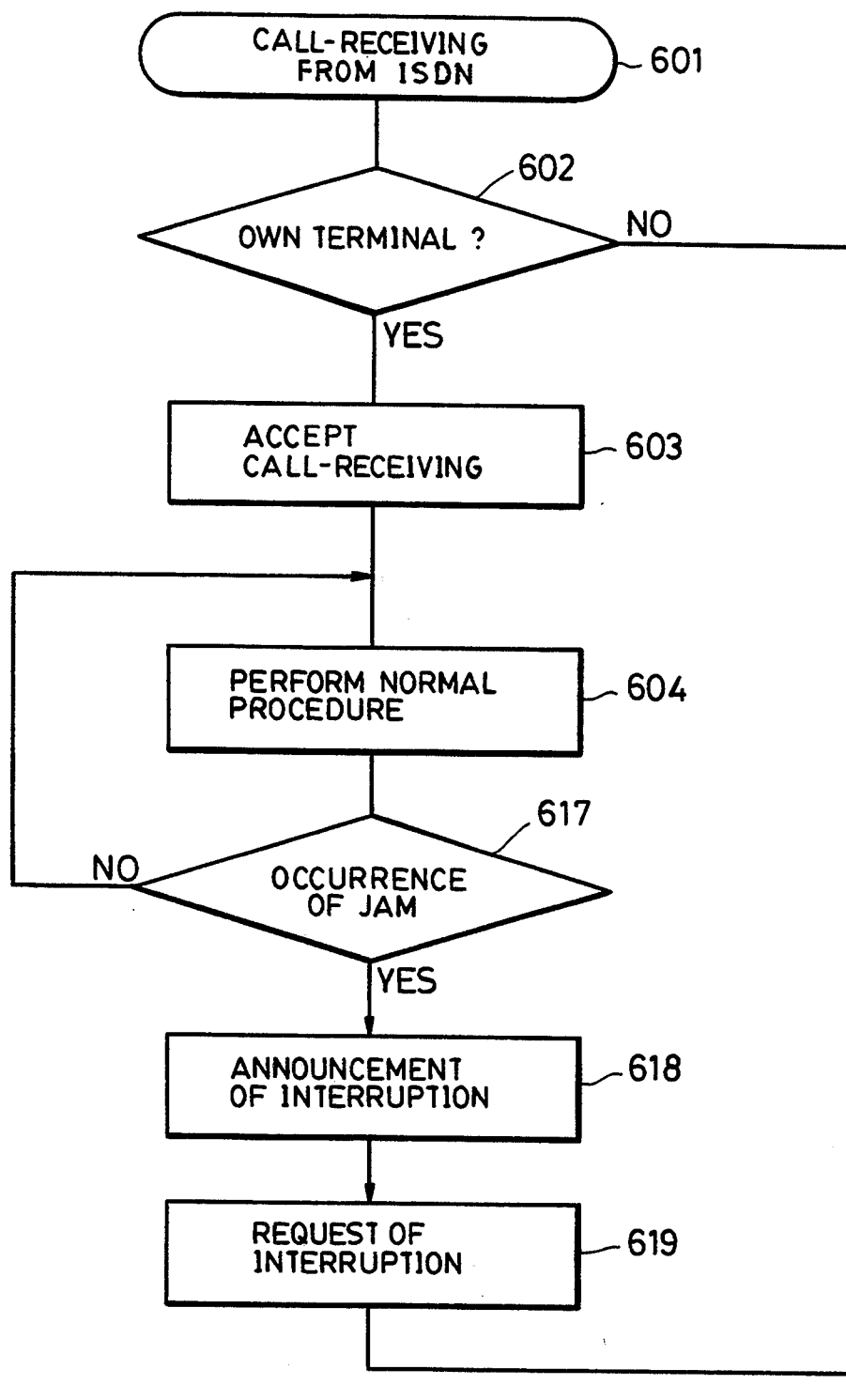
FIG. 8, composed of FIGS. 8A and 8B, is a program processing flowchart in the FIG. 7 embodiment.

FIGS. 7 and 8 show another embodiment of the present invention.

In the above-described embodiment, the facsimiles subjected to bus connection to the ISDN circuit have the function of monitoring a D-channel signal on the bus of the ISDN circuit. If there occurred the exhaustion of toner in the printer of one facsimile, and an announcement of interruption has been issued by a D-channel signal, the announcement is detected by the D-channel signal monitored by the other facsimile, which performs the resumption procedure in place of the one facsimile and substitutes reception. On the other hand, in the present embodiment, if jam of paper occurred in the printer of one facsimile, and an announcement of interruption has been issued by a D-channel signal, the announcement is detected by the D-channel signal monitored by the other facsimile, which performs the resumption procedure in place of the one facsimile and substitutes reception.

That is, although the configuration of the present embodiment is basically identical to that explained with reference to FIGS. 1 through 3, and 5, the diagnostic information for the contents of the reason shown in FIG. 5 indicates "jam of paper at the terminal" in the present embodiment. Furthermore, the facsimile used includes a jam detection circuit, as shown in FIG. 3, and has a function of issuing an announcement of interruption due to jam when jam of paper has occurred (steps 617–619 in FIG. 8).

Furthermore, in the present embodiment, as shown in FIG. 8, the determination at step 609a is relative to "jam of paper at the terminal", while other processes may be the same as in the preceding embodiment.

As in the preceding embodiment, the substitution of reception is performed in a state in which, for example, the FAX B is in communication with the correspondent, and the FAX A shifts to processes after step 605.

In the present embodiment, in FIG. 8, when the process proceeds from step 608 to step 609a, the following procedure is executed.

That is, the diagnostic information for the display of reason is determined. If "jam of paper at the terminal" (see phase B in FIG. 7) has been indicated, the resumption procedure is performed in place of the terminal which has issued an announcement of interruption (step 610), a normal communication procedure is performed (step 616), and the communication is continued (see phase C in FIG. 7).

Thus, according to the present embodiment, the facsimile has a control function with the network by a D-channel signal in order to be subjected to bus connection on the ISDN circuit, and a monitoring function of a D-channel signal. The facsimile detects that an announcement of interruption due to the reason of jam of paper has been issued from the other terminal facsimile by D-channel signal control, performs the succeeding resumption procedure in place of the other terminal facsimile, and performs the substituting reception function by subsequently entering into a reception operation. As in the preceding embodiment, by having the configuration so that the other facsimile performs substituting reception during communication, it is possible to suppress the increase in the unit cost of the facsimile, and to intend an effective utilization of the bus connection of the ISDN circuit.

Figure 10A:
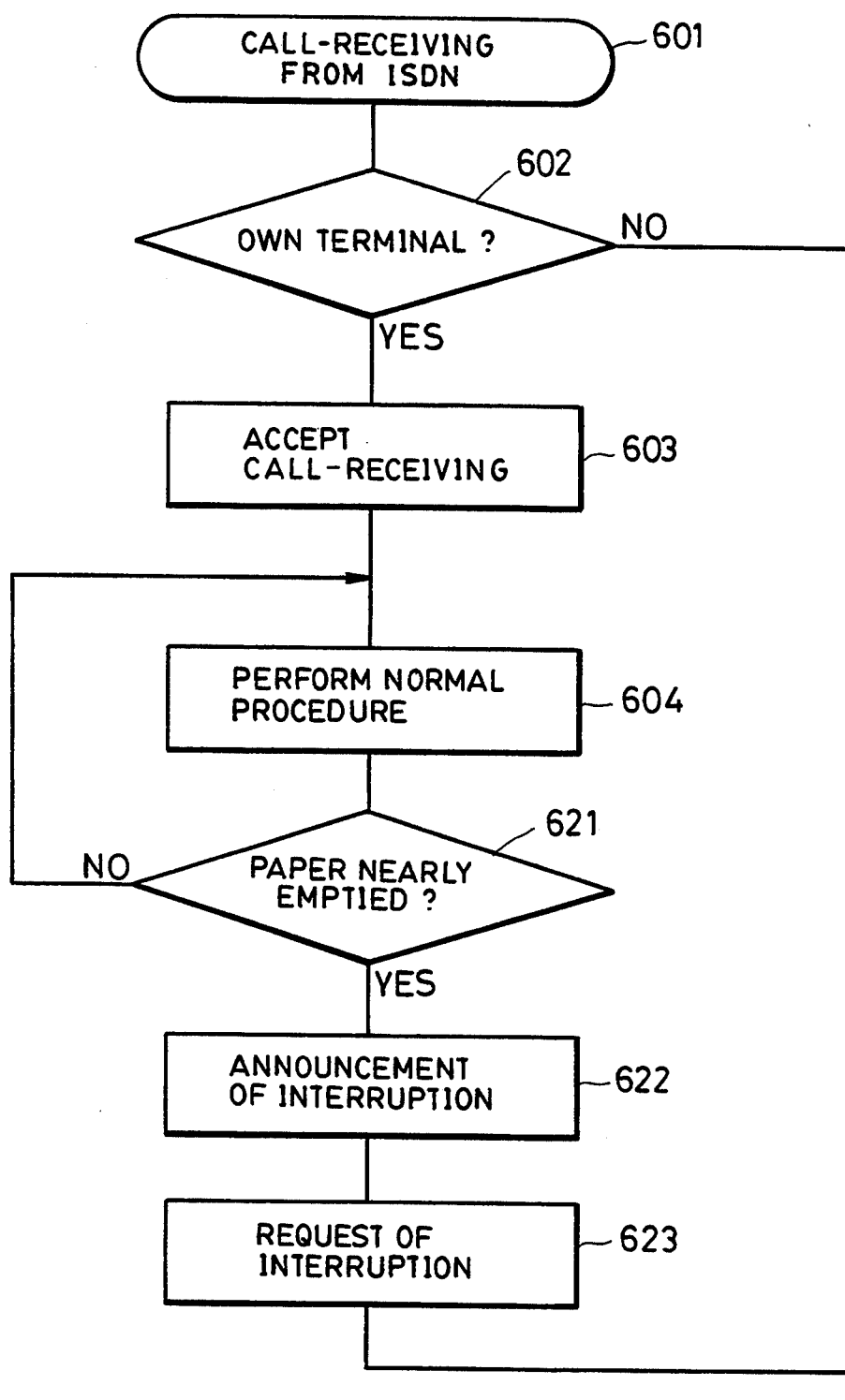
FIG. 10, composed of FIGS. 10A and 10B, is a program processing flowchart in the FIG. 9 embodiment.

FIGS. 9 and 10 show still another embodiment of the present invention.

The configuration of the present embodiment is intended to dissolve the inconvenience when a facsimile has a large-capacity memory and a deck for reception paper so that the apparatus itself can perform substituting reception for the purpose of dealing with a nearly emptied state of the receiving paper, that is, the problem which results in increase in the costs of the memory device and the deck for reception paper, and a large facsimile.

That is, in the present embodiment, each of a plurality of facsimiles subjected to bus connection to an ISDN circuit has a function of detecting a nearly emptied state of reception paper, a function of issuing an announcement of interruption using a D-channel signal when the nearly emptied state has occurred, and a function of monitoring the D-channel signal on a bus. The facsimile has a configuration in which, when there is a call-receiving after the nearly emptied state has been detected, an announcement of interruption is issued after accepting the call-receiving. The facsimile is also configured so that, when the other terminal facsimile has been selected, the issue of the above-described announcement of interruption is detected by a terminal facsimile monitoring the D-channel signal, which facsimile performs the resumption procedure in place of the other terminal facsimile, and substitutes the reception.

Although, in the present embodiment also, the basic configuration is the same as in the above-described embodiments, the diagnostic information 513 shown in FIG. 5 is relative to "a nearly emptied state of paper in the terminal", and the frame having such a configuration is monitored on the D-channel signal by the other facsimile which is not in reception.

In the present program example, as shown in FIG. 10, the step 609 or 609a is replaced by step 609b for determining a nearly emptied state of paper in the terminal, and steps 620 and 621–623 are further added.

In FIG. 10, call-receiving by a D-channel signal for each of the facsimiles connected to the bus of the ISDN when call setting is transmitted from a facsimile terminal of the correspondent (step 601), determination by the call number 5 whether or not the call-receiving is for its own terminal (step 602), the acceptance of the call-receiving when it is for its own terminal (step 603), and a normal procedure (step 604) are the same as in the preceding embodiments. In the present embodiment, however, a nearly emptied state of paper is determined by its own apparatus at step 621. If the answer is "no", that is, the apparatus is not in a nearly emptied state of paper, the process returns to a normal reception procedure (step 604).

To the contrary, when a nearly emptied state of paper has occurred (when the answer at step 621 is "yes"), the issue of an announcement of interruption and a request of disconnection are executed (steps 622 and 623), and the process returns to the initial state (step 611). Thus, when the call-receiving from the network is for its own terminal (when the answer at step 602 is "yes"), it is determined whether or not the paper is in a nearly emptied state during reception (step 621). If the paper is in a nearly emptied state, an announcement of interruption is issued (step 622), and the call-receiving is disconnected (step 623). By this procedure, interruption during call-receiving is performed.

On the other hand, when the call-receiving from the network is not the processes after step 605 shown in FIG. 10 are performed at the facsimile side (the FAX A side in FIG. 9). If the process has proceeded to step 608, where the display of reason is seen in accordance with the format of the disconnection frame, the diagnostic information for the display of reason is checked, and it is determined whether or not a "nearly emptied state of paper in the terminal" has occurred (step 609b). At this stage, if the other terminal facsimile has issued an announcement of interruption due to the reason of a nearly emptied state of paper in the above-described processing in the call-receiving, and accordingly, the "nearly emptied state of paper in the terminal" has been indicated at the above-described step 609b, the facsimile per forms forms the resumption procedure in place of the terminal which has issued the announcement of interruption (step 610), performs a normal reception procedure (step 620), and continues the reception.

Thus, according to the above-described configuration, the facsimile has a control function with the network by a D-channel signal in order to be subjected to bus connection on the ISDN circuit, a monitoring function of a D-channel signal, and a function of detecting a nearly emptied state of reception paper. When there is a call-receiving from the network after the detection, the facsimile issues an announcement of interruption after the call-receiving has once been accepted. The other facsimile monitors the announcement of interruption, performs the resumption procedure in place of the facsimile which has issued the announcement of interruption, and then enters in the reception operation. The other facsimile can thus perform the function of substituting reception. Accordingly, the facsimile needs not have a large-capacity memory device or a deck for reception paper in order to perform substituting reception by its own apparatus. This approach can prevent increase in the costs of the memory device and tile deck for reception paper, and a large facsimile.

Next, an explanation will be provided of a case in which, when either one trouble of the above-described "no toner", "jam" and "paper in the terminal nearly emptied" has occurred, the communication is shifted to the other terminal.

Figure 11A:
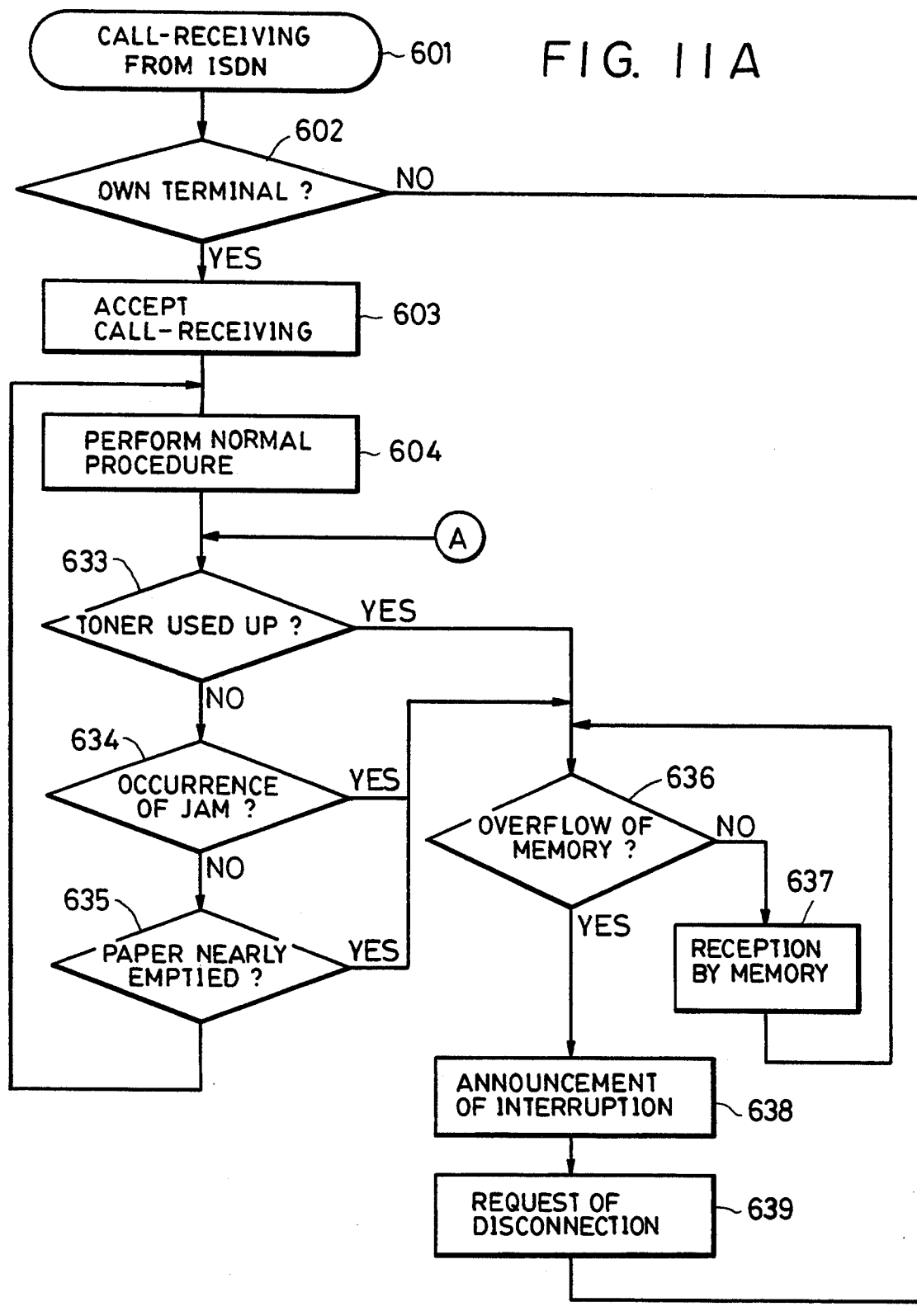
FIG. 11, composed of FIGS. 11A and 11B, is a program processing flowchart in still another embodiment.

FIG. 11 is a flowchart in this case. In FIG. 11, since the steps 601–609 are the same as in the flowchart described before, an explanation thereof will be omitted.

If either one of "no toner", "jam" and "paper in the terminal nearly emptied" has occurred during a normal reception processing, the process proceeds from either one of steps 633, 634 and 635 to step 636. At step 636, it is determined whether or not the memory 16 in the own terminal overflows. When there is an allowance in the memory, the process proceeds to step 637, where reception by the memory is performed. When the number of received pages is small, the communication is terminated after reception by the memory. In the present embodiment, the memory does not have a large capacity. Hence, if the memory overflows during reception by the memory, the process proceeds to step 638 and 639, where an announcement of interruption and the request of disconnection are issued, respectively. At this time, the diagnostic information 513 shown in FIG. 5 is determined in accordance with the result of the determination at steps 633–635.

When the terminal which performs substituting reception receives an announcement of disconnection and a request of disconnection while monitoring the D-channel signal, the terminal determines the reason for the disconnection (steps 609, 630 and 631), and performs substituting reception (steps 610 and 632).

The present embodiment differs from the above-described embodiments in that, when a trouble has occurred in the substituting terminal during substituting reception, a request for substituting reception can be issued for the other third terminal.

That is, if a trouble has occurred during substituting reception at step 632, the process shifts from either one of the above-described steps 633–635 to the processing at steps 636–639, and the substituting terminal can make the other third terminal perform substituting reception.

As explained above, according to the present invention, the other facsimile can perform substituting reception without using a memory device or the like as in the prior art. Hence, the present invention has the effects that it is possible to suppress the unit cost of a facsimile low, and to effectively utilize the bus connection of an ISDN circuit.

The present invention is not limited to the above-described embodiments, but various changes and modifications may be made within the spirit and scope of the appended claims.

For example, although there are two facsimiles subjected to bus connection in the above-described embodiments, the identical functions may also be achieved even when a plurality of facsimiles are connected within the range in which the performance of the bus 2 shown in FIGS. 1 and 2 can be maintained. Hence, higher effects may be obtained.

What is claimed is:

1. A first facsimile apparatus in a communication system on a data reception side thereof, the system comprising the first facsimile apparatus and a second facsimile apparatus each connected to an inside bus of an integrated services digital network, ISDN, said first facsimile apparatus comprising:
   means for monitoring a signal on the inside bus of the ISDN;
   means for determining whether or not the monitored signal is an announcement of interruption from the second facsimile apparatus on the bus; and
   means for performing substituting reception in place of the second facsimile apparatus when said determination means has determined that the signal is an announcement of interruption;
   wherein said announcement of interruption is a signal indicative of interruption of reception of data from the ISDN by the second facsimile apparatus output during the reception of the data from the ISDN, and
   wherein said performing means performs, in place of the second facsimile apparatus, the reception of the data, thus enabling reception of the data from the ISDN which was interrupted by the second facsimile apparatus,
   said first facsimile apparatus further comprising means for determining whether or not an abnormality has occurred in said first facsimile apparatus during the substituting reception, and means for issuing an announcement of interruption onto the bus when an abnormality has occurred.

2. A facsimile apparatus according to claim 1, wherein said monitor means monitors a D-channel signal on the inside bus.

3. A facsimile apparatus according to claim 1, wherein said determination means determines from the announcement of interruption that toner has been exhausted in the other facsimile apparatus.

4. A facsimile apparatus according to claim 1, wherein said determination means determines from the announcement of interruption that recording paper in the other facsimile apparatus has jammed.

5. A facsimile apparatus according to claim 1, wherein said determination means determines from the announcement of interruption that there has been a shortage of recording paper in the other facsimile apparatus.

6. A first facsimile apparatus in a communication system on a data reception side thereof, the system comprising the first facsimile apparatus and a second facsimile apparatus each connected to an inside bus of an integrated services digital network, ISDN, said first facsimile apparatus comprising:
   reception means for receiving an image transmitted via the ISDN;
   recording means for recording the image received by said reception means;
   determination means for determining whether or not trouble has occurred during the recording of the image by said recording means; and
   interrupting means for interrupting the reception of the image during the reception of the image from the ISDN when said determination means has determined the occurrence of trouble;

said interrupting means issuing an announcement of interruption to said inside bus to enable the second facsimile apparatus on said inside bus to perform the reception of the image that was interrupted, said first facsimile apparatus further comprising a memory for storing the image and means for determining whether or not the memory overflows when trouble occurs, and wherein said first facsimile apparatus issues said announcement of interruption when the memory has overflowed, and performs reception by the memory when the memory has not overflowed.

7. A facsimile apparatus according to claim 6, wherein said determination means determines whether or not toner has exhausted in the recording means.

8. A facsimile apparatus according to claim 6, wherein said determination means determines whether or not jam of recording paper has occurred in the recording means.

9. A facsimile apparatus according to claim 6, wherein said determination means determines whether or not there is a shortage in recording paper in the recording means.

10. A facsimile apparatus according to claim 6, wherein said issuing means issues the announcement of interruption using a D-channel signal.

11. A facsimile system on a data reception side of a communication system comprising:

first and second facsimile apparatuses connected to a bus of an ISDN;

said first facsimile apparatus comprising:

reception means for receiving an image signal;

recording means for recording an image on recording paper according to said received image signal; and means for interrupting the reception of said image signal and for issuing an announcement of interruption when trouble has occurred in said recording means during recording of said image by said recording means;

said second facsimile apparatus comprising:

detection means for detecting the announcement of interruption issued onto said bus; and means for starting reception of said image signal when said detection means has detected the announcement of interruption, wherein the reception of said image signal was interrupted by the interrupting means of said first facsimile apparatus, wherein said first facsimile apparatus further includes a memory for storing the image and means for determining whether or not the memory overflows when trouble occurs, and wherein said first facsimile apparatus issues said announcement of interruption when the memory has overflowed, and performs reception by the memory when the memory has not overflowed.

12. A facsimile system according to claim 11, wherein said issuing means issues the announcement of interruption using a D-channel signal.

13. A facsimile system according to claim 11, wherein said issuing means issues the announcement of interruption when any one of no toner, jam of paper and a shortage of paper has occurred in the recording means.

14. A facsimile system according to claim 11, wherein said second facsimile apparatus further includes means for determining whether or not an abnormality has occurred in the apparatus during said substituting reception, and means for issuing an announcement of interruption onto said bus when an abnormality has occurred.

* * * * *

UNITED STATES PATENT AND TRADEMARK OFFICE
CERTIFICATE OF CORRECTION

PATENT NO. : 5,355,230
DATED : October 11, 1994
INVENTOR(S) : YOJI KANEKO

It is certified that error appears in the above-identified patent and that said Letters Patent is hereby corrected as shown below:

ON TITLE PAGE

In [56] References Cited, under U.S. PATENT DOCUMENTS:
```
"4,995,073  0/0000  Okata et al.
 5,001,709  0/0000  Satoh"
``` should read
```
--4,995,073  2/1991  Okata et al.
  5,001,709  3/1991  Satoh--.
```

COLUMN 8

Line 40, "not" should read --not for its own terminal,--.
Line 54, "per forms forms" should read --performs--.

COLUMN 10

Line 66, "during the reception of the image" should be deleted.
Line 67, "ISDN" should read --ISDN during the reception of the image--.
Line 68, "trouble;" should read --trouble,--.

UNITED STATES PATENT AND TRADEMARK OFFICE
CERTIFICATE OF CORRECTION

PATENT NO. : 5,355,230
DATED : October 11, 1994
INVENTOR(S) : YOJI KANEKO

It is certified that error appears in the above-identified patent and that said Letters Patent is hereby corrected as shown below:

<u>COLUMN 11</u>

Line 26, "issuing" should read --interrupting--.

Signed and Sealed this

Fourteenth Day of March, 1995

Attest:

BRUCE LEHMAN

*Attesting Officer*          *Commissioner of Patents and Trademarks*